Patented July 12, 1949

2,476,242

UNITED STATES PATENT OFFICE 2,476,242

PROCESS FOR PREPARING A RYE SOUR FOR BAKING PURPOSES

Harry Ginsburg, Atlantic City, N. J.

No Drawing. Application May 16, 1947, Serial No. 748,658

2 Claims. (Cl. 99—90)

The instant invention relates to a process for preparing a sour flour to be used in the baking of sour rye bread, known also as the Jewish type of rye bread.

Heretofore, the making of this product varied considerably depending on the type and quantity of souring material used and other factors, so that there resulted a variance in taste and quality of the final product from day to day.

It is accordingly, an object of the present invention to make a sour flour which can be stored indefinitely without deterioration and which is to supplant the present sour and which flour will be of uniform quality at all times and which will form the base to which the other ingredients will be added prior to the baking operation.

There are certain known souring materials of the type above referred to, namely, for the making of sour rye baking products, requiring the preparation of a nutrient medium or wort and the inoculation of said medium with acid-forming bacteria, the acids formed comprising fatty acids such as acetic or propionic, and also others such as lactic acid formers. It has also been suggested that a stable, dry leavenous agent be prepared by causing a food flour to undergo dough fermentation in a weakly moistened condition, followed by drawing away by volatilization the alcohol generated, but as far as is known by the present applicant this has not proved entirely satisfactory.

The practice of the present invention may be commenced by first preparing a rye sour and it will be understood that the weights of the ingredients set out hereinafter are based on relative proportions rather than on absolute or limiting weights. The rye sour aforementioned is made by thoroughly mixing three pounds of water with four pounds of a pure white rye flour and two ounces of yeast, the latter being preferably a pure culture of leaven yeast readily obtainable. The mixture so prepared is set at a temperature of 70° F. after which it is removed to a fermentation room where said mixture is permitted to ferment for a period of twenty-four hours, the temperature being maintained at 80° F. and the relative humidity at 80 per cent.

At the tremination of the twenty-four hour period referred to, an additional three pounds of water and four pounds of pure white rye flour are added to the fermented sour as above prepared and this is again set at a temperature of 70° F. There then follows a further removal to the fermentation room where the temperature is maintained the same as above for an additional period of six hours, namely, 80° F. with the relative humidity again at 80 per cent.

When the last six hour period has elapsed, six pounds of water and eight pounds of pure white rye flour are added to the fermented mass, mixed therewith, set at 70° F. and left to ferment for another six hours at the same temperature and humidity. This step is repeated every six hours with a doubling of the preceding quantity of both the water and the pure white rye flour until forty-eight hours have elapsed from the time of commencement of the process, when the quantity of fermented rye sour will now total two hundred and twenty-four pounds. From the two hundred twenty-four pound total, seven pounds are now removed and becomes the basis or starting point for the next batch; and there is added to the remaining mass of two hundred and seventeen pounds, three hundred pounds of pure white rye flour which has been stored at 70° F. The two hundred and seventeen pounds of sour and three hundred pounds of pure white rye flour are first mixed at a slow speed for five minutes and then for approximately ten minutes longer at a medium speed or as long as required to have the mixture reach a temperature of 80° F. Finally, the granules resulting from the treatment described are dried for forty-eight hours at 50° F. at the end of which time it will be found that they are hard and are then ground into a final product closely resembling flour.

The sour flour can be stored indefinitely without deterioration, and as indicated in the objects of invention, is intended to supplant present available souring materials used in rye bread making. Sour flour made as indicated can be mixed with selected quantities of clear flour, salt and water, prior to baking to produce the finished Jewish or sour rye bread or other rye baked products.

While my process has been described in detail, it will be understood that different quantities of water and flour may be employed, provided the respective ratios of each are maintained. Also, various minor changes may be made in the specific procedure outlined and it is intended to cover all such and to be limited in this respect only as may be necessary by the scope of the claims hereto appended.

What I claim and desire to secure by Letters Patent is:

1. The method of making a sour flour which comprises mixing the following ingredients in the approximate ratio by weight indicated, namely Rye flour _____ 4
Water _____ 3
Yeast _____ .125 then fermenting the mixture for a period of twenty-four hours at 80° F. and 80 per cent humidity; then adding the same quantity of each of rye flour and water, as above; fermenting the mixture so formed for a period of six hours at the same temperature and humidity, as above; then adding double the quantity of each of rye flour and water used in the preceding step and fermenting the mixture so formed for a period of six hours at the same temperature and humidity, as above; then continuing the process by doubling the quantity of each of the rye flour and water used in the preceding step and fermenting the total mass for the same period of time at the same temperature and humidity until a total weight ratio of two hundred and twenty-four is reached, then removing seven parts of the final product, then mixing the remaining two hundred and seventeen parts with three hundred parts of rye flour and finally drying for forty-eight hours at 50° Fahrenheit and then grinding the hard sour flour so formed.

2. The method of making a sour flour for use as the basis of a baked product which comprises first mixing a quantity of each of rye flour, water and yeast and maintaining same for approximately 24 hours at a fermentable temperature and humidity, then adding approximately the same quantity of each of rye flour and water to the original fermented mixture and maintaining the new mixture at approximately the same fermentable temperature and humidity as the original mixture and for approximately a quarter of the original time period, then adding increased quantities of each of rye flour and water in definite ratios to each preceding mixture and each time maintaining the mixture so formed at approximately the same fermentable temperature and humidity and for the same time period as the preceding mixture until a definite quantity of material is formed, then adding a quantity of rye flour in definite ratio to said last mentioned material, then drying the product at approximately 50° F. for a fixed time period, and finally grinding the hard sour flour so formed.

HARRY GINSBURG.

REFERENCES CITED

The following references are of record in the file of this patent:

UNITED STATES PATENTS

| Number | Name | Date |
|---|---|---|
| 1,910,967 | Ruckdeschel | May 23, 1933 |
| 2,322,940 | Kirby | June 29, 1943 |

OTHER REFERENCES

Wihlfahrt, A Treatise on Baking, 2 ed. (1934), Standard Brands, Inc., page 368.